Figure 1:
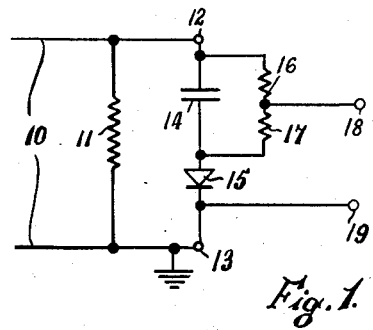

July 30, 1957  R. BEAUFOY  2,801,283
APPARATUS FOR CONVERTING VARYING UNI-DIRECTIONAL
VOLTAGE INTO ALTERNATING VOLTAGE
Filed Feb. 18, 1952

INVENTOR
Raymond Beaufoy
By Ralph B. Stewart
attorney

United States Patent Office 2,801,283
Patented July 30, 1957

2,801,283

APPARATUS FOR CONVERTING VARYING UNI-DIRECTIONAL VOLTAGE INTO ALTERNATING VOLTAGE

Raymond Beaufoy, Taplow, England, assignor to British Telecommunications Research Limited, Taplow, England, a company of Great Britain Application February 18, 1952, Serial No. 272,240

Claims priority, application Great Britain February 22, 1951

19 Claims. (Cl. 178—70)

The present invention relates to electric circuit arrangements for use in converting uni-directional voltage into alternating voltage.

Where the varying component of a uni-directional voltage is of regular form, that is to say, successive half-cycles thereof are of identical shape and amplitude although opposite in sign as in a sine wave or an oscillation of square wave form, and it is required to convert this uni-directional voltage into an alternating voltage whose positive and negative-going excursions are of equal amplitude, it is necessary merely to pass the uni-directional voltage through a capacitor. The capacitor blocks the passage of the direct component of the voltage and allows only the varying component to pass. As the successive half-cycles of the varying component are identical, the output voltage obtained is one in which the negative and positive-going excursions are of equal amplitude.

Where, however, the successive negative and positive-going parts of the varying component of the uni-directional voltage are of equal amplitudes, but are of random durations, or of durations which may vary in a non-cyclic manner, the problem arises of removing the direct component and, in addition, causing the positive and negative-going parts of the separated varying component to appear at either equal amplitudes relatively to the mean value of zero, or at amplitudes, relatively to the mean value of zero, which bear a predetermined fixed relation to one another.

For example, in telegraphy a message may consist of a succession of uni-directional signal elements of unequal durations and it may be required to convert these signal elements into alternately positive and negative-going pulses of equal amplitudes for operating telegraph equipment. If the uni-directional voltage in this example is merely passed through a capacitor to remove the direct component, the amplitudes of the positive and negative-going excursions in the alternating voltage obtained would vary in dependence upon the relative durations of the negative and positive-going signal elements.

An object of the present invention is to provide an improved and simple electric circuit arrangement whereby the aforesaid problem can be solved.

According to the present invention an electric circuit arrangement for converting a uni-directional voltage to an alternating voltage comprises a capacitor and a rectifier device connected in series between two input terminals, a resistive device connected across the capacitor, a first output terminal connected to a point in the resistive device and a second output terminal connected to the terminal of the rectifier device remote from the capacitor. The resistive device may, for example, comprise two resistors connected in series and the said point may be the junction of the two resistors with one another; or may comprise a potentiometer having its fixed element connected across the capacitor, in which case the point of contact between the wiper of the potentiometer and the fixed element constitutes the said point in the resistive device. The uni-directional voltage is applied to the input terminals in a sense such that the capacitor becomes charged through the rectifier to the peak value of the input voltage. Alternatively the rectifier is connected into the circuit in a sense, dependent upon the polarity of the input voltage, that the capacitor becomes charged to the peak value of the input voltage. If the resistances between the said point and the two terminals of the capacitor are equal, and if the positive and negative-going parts of the varying component of a uni-directional voltage applied to the input terminals are of equal amplitudes, the positive and negative-going parts of the output voltage will also be of equal amplitudes. By varying the position of the said point, however, the ratio of the amplitude of the negative-going parts of the output voltage to that of the positive-going parts thereof can be given any desired value.

Figure 2:
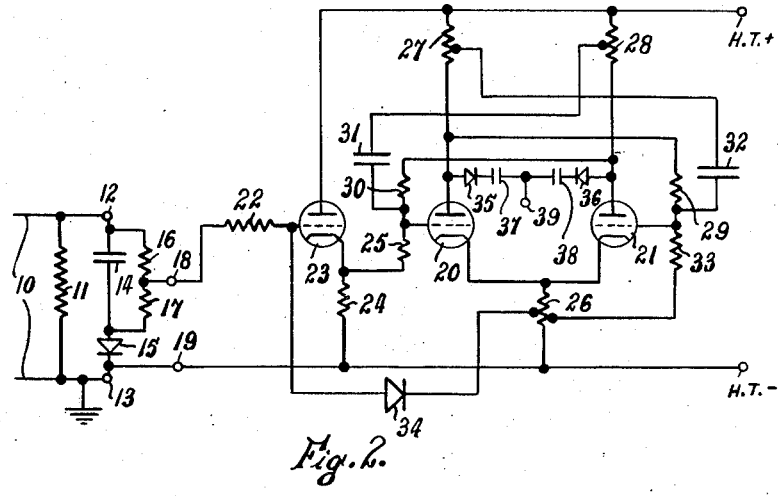

The invention will now be described, by way of example, with reference to the accompanying drawings, in which:

Figure 1 is a theoretical circuit diagram of a circuit arrangement according to the invention, and Figure 2 is a theoretical circuit diagram of telegraph apparatus embodying the invention.

Referring to Figure 1, a transmission line 10 whose impedance is represented by a resistor 11, is connected to two input terminals 12 and 13 of a network comprising a capacitor 14 connected in series with a rectifier 15 to the two input terminals. Uni-directional telegraph signals of an amplitude of 20 volts are applied through the line 10 to the terminals 12 and 13. These signals consist of mark and space signals, a mark signal being a pulse of an amplitude of 20 volts, and a space signal being a period of zero voltage. The relative durations of the mark and space signals vary in a non-cyclic manner and the terminal 12 is assumed to become positive relatively to the terminal 13 for the duration of each mark signal.

The capacitor becomes fully charged therefore to 20 volts, the upper plate thereof in the drawing being positive relatively to the lower plate. During each mark signal when the rectifier 15 is conducting the lower plate of the capacitor is substantially at earth potential owing to the low forward resistance of the rectifier. During each space signal, however, the rectifier 15 is non-conducting and as the upper plate of the capacitor is connected to earth through the impedance of the line 10 the potential of the lower plate of the capacitor 14 becomes 20 volts negative with respect to earth.

Two resistors 16 and 17 of equal resistances are connected in series across the capacitor 14 and the junction of the two resistors with one another is connected to an output terminal 18 and a second output terminal 19 is connected to earth. Thus the potential of the terminal 18 relatively to that of the terminal 19 is always half the potential difference across the capacitor 14. It will be seen, therefore, that in this example the terminal 18 is 10 volts positive relatively to the terminal 19 during each mark signal, and is 10 volts negative during each space signal.

Referring to Figure 2 this shows the arrangement of Figure 1 embodied in the input circuit of a telegraph distortion measuring set (T. D. M. S.). The positive and negative-going mark and space signals appearing at the terminal 18 are applied to a circuit comprising two triode valves 20 and 21 and usually referred to as a T. D. M. S. input toggle. The input toggle serves the purpose of producing positive and negative-going mark and space signals of rectangular waveform from the mark and space signals applied thereto irrespective of irregularities in the applied signals introduced during their transmission over the line 10. The arrangement shown also serves to generate a sharp pulse at each changeover from mark to space and vice versa for a purpose to be described later.

The terminal 18 is connected through a resistor 22 to the control grid of a triode valve 23 whose cathode is connected to earth through a cathode load resistor 24, and whose anode is connected to the positive terminal HT+ of a source (not shown) of high tension. The negative terminal HT— of the high tension source is connected to earth.

The cathode of the triode 23 is connected through a resistor 25 to the control grid of the triode 20 whose cathode is connected to earth through a resistor 26 which is a common cathode resistor for the two valves 20 and 21. The anodes of the two triodes 20 and 21 are connected to the terminal HT+ through resistors 27 and 28 respectively, and resistors 29 and 30 are connected between the anode of the valve 20 and control grid of the valve 21, and the anode of the valve 21 and the control grid of the valve 20, respectively. A capacitor 31 is connected between the control grid of the valve 20 and a tap on the resistor 28, a capacitor 32 is connected between the control grid of the valve 21 and a tap on the resistor 27, and a resistor 33 is connected between the control grid of the valve 21 and a tap on the common cathode resistor 26.

In operation the mean potential of the control grid of the cathode follower valve 23 is zero and goes alternately positive and negative. The cathodes of the valves 20 and 21 are positive relatively to earth because of the voltage drop across the resistor 26. When the control grid of the valve 23 is made positive, the cathode thereof becomes more positive by a like amount, and when the control grid of the valve 23 is made negative by more than a predetermined amount the anode current in the valve 23 is reduced to zero. Thus the voltage between the control grid and cathode of the valve 20 can readily be caused to change from one value to another, the two values being respectively above and below a predetermined value at which anode current cut-off results in the valve 20.

The circuit operates in known manner such that when the control grid of the valve 20 is made more than say one volt positive relatively to the said predetermined value the valve 20 rapidly becomes highly conducting, and the valve 21 becomes non-conducting and when the control grid of the valve 20 is made less than the said predetermined value, the valve 20 rapidly becomes non-conducting and the valve 21 becomes conducting. The voltages at the anodes of the valves 20 and 21 are therefore of rectangular form. The resistor 22 in conjunction with a rectifier 34 constitutes a limiter which limits the amplitude of the positive-going signals applied to the control grid of the valve 23 to a value determined by the bias applied to the rectifier 34 from a tap on the resistor 26. By so limiting the amplitude of the positive-going voltage on the control grid of the valve 23 the amplitude of the current flowing in the valves 23 and 20 is also limited.

The voltage of rectangular waveform appearing at the anode of either of the valves 20 and 21 or the voltage appearing between these anodes may be employed to control an oscillation generator as described in co-pending patent application Serial No. 152,249, filed March 27, 1950, now Patent No. 2,748,285, for the purpose of producing a spiral time base for a cathode ray tube (not shown) in the T. D. M. S.

In order to generate a sharp pulse at the instant of changeover from each mark signal to the next succeeding space signal and vice versa, two rectifiers 35 and 36 and two capacitors 37 and 38 are provided. The rectifier 35 and the capacitor 37 are connected in series between the anode of the valve 20 and an output terminal 39, and the rectifier 36 and the capacitor 38 are connected in series between the anode of the valve 31 and the output terminal 39. These pulses may, for example, be applied to brighten the trace on the screen of the aforesaid cathode ray tube at the instants of changeover from mark to space and vice versa.

I claim:

1. An electric circuit arrangement for converting a unidirectional voltage to an alternating voltage, comprising a capacitor and a rectifier device connected in series between two input terminals, a resistive device connected across the capacitor, a first output terminal connected to a point in the resistive device and a second output terminal connected to the terminal of the rectifier device remote from the capacitor.

2. An electric circuit arrangement according to claim 1, comprising a toggle circuit connected to the said output terminals, the toggle circuit comprising two electron discharge valves each having an anode, a cathode and at least one control electrode, a common cathode load for the two valves, a coupling between the anode of each of the two valves and the control electrode of the other, and a cathode follower arrangement for connecting the said output terminals to the toggle circuit, the cathode follower arrangement comprising a further electron discharge valve having an anode, a cathode and at least one control electrode, a load impedance element in the cathode circuit of the further valve, a connection from the said first output terminal to the control electrode of the further valve, a connection from the said second output terminal to the end of the said load impedance element remote from the cathode of the further valve, and a connection from the cathode of the further valve to the control electrode of one of the first said valves.

3. An electric circuit arrangement according to claim 2, comprising a further rectifier device connected between the control electrode of the further valve and a point in the said common cathode load.

4. An electric circuit arrangement according to claim 2, comprising a rectifier device and capacitor connected in series between the anode of one of the first said valves and a further output terminal.

5. An electric circuit arrangement according to claim 4, comprising a further rectifier device and capacitor connected in series between the anode of the other of the first said valves and the said further output terminal.

6. An electric circuit arrangement according to claim 3, comprising a rectifier device and capacitor connected in series between the anode of one of the first said valves and a further output terminal.

7. An electric circuit arrangement according to claim 6, comprising a further rectifier device and capacitor connected in series between the anode of the other of the first said valves and the said further output terminal.

8. In a telegraph signalling circuit arrangement having a resistive circuit component across which a mark-space signal comprising positive going mark and zero potential space signal elements appear, a capacitor and a unilateral empedance element connected in series across said resistive circuit component, and a pair of resistors connected in series across said capacitor thereby to produce a mark-space telegraph signal comprising positive going mark and negative going space signal elements between the junction of said resistors and the junction between said resistive circuit component and said unilateral impedance element.

9. A circuit arrangement for converting periodic electric current excursions to one side only of a reference current into electric currents varying to either side of said reference current, including input terminals to which said periodic electric current is applied and output terminals at which said electric currents are available, a resistive element being connected across said input terminals, a shunt connected capacitive and resistive branch network having one terminal thereof connected to one of said input terminals, a switching element connected between the other of said input terminals and the other terminal of said shunt network, one of said output terminals being connected to said other of the input terminals and the other of said output terminals being connected to the resistive branch of said network intermediate the ends thereof.

10. A circuit arrangement for converting periodic electric current excursions to one side of a reference current into electric currents varying to either side of said reference current, including input terminals to which said periodic electric current is applied and output terminals at which said electric currents are available, a resistive element connected across said input terminals, a shunt connected capacitive and resistive branch network having one terminal thereof connected to one of said input terminals, a switching element connected between the other of said input terminals and the other terminal of said shunt network, one of said output terminals being connected to said other of the input terminals and the other of said output terminals being connected to the resistive branch of said network intermediate the ends thereof, said switching element presenting a relatively high impedance across the terminals thereof when the potential across the capacitive branch of said network is greater than the potential applied to said input terminals.

11. A circuit arrangement for converting single current telegraph code signals into double current telegraph code signals, including input terminals to which said single current code signals are applied and output terminals at which said double current code signals are available, a resistive element connected across said input terminals, a shunt connected capacitive and a resistive branch network having one terminal thereof connected to one of said input terminals, a switching element connected between the other of said input terminals and the other terminal of said shunt network, and connections coupling said output terminals across said switching element and a point on the resistive branch of said network intermediate the ends thereof.

12. A circuit arrangement for converting periodic electric current excursions to one side only of a reference current into electric currents varying to either side of said reference current, including a pair of input and a pair of output terminals, one terminal of each pair being connected to a point of fixed reference potential, a resistive circuit component connected across said pair of input terminals, a capacitor, a tapped resistor having the extremities connected to the terminals of said capacitor to form a shunt network, a switching element connecting one terminal of said network to said point of fixed reference potential, and connections coupling the other terminal of said network to said input terminals and the tapping of said resistor to said output terminals, said switching element presenting a relatively high impedance across the terminals thereof when the potential across said capacitor is greater than the potential applied to said input terminals.

13. A circuit arrangement for converting periodic electric current excursions to one side only of a reference current into electric currents varying to either side of said reference current, including a pair of input and a pair of output terminals, one terminal of each pair being connected to a point of fixed reference potential, a resistive circuit component connected across said pair of input terminals, a capacitor, a tapped resistor having the extremities connected to the terminals of said capacitor to form a shunt network, a rectifier element connected between one terminal of said network and said point of fixed reference potential, and connections coupling the other terminal of said network to said input terminals and the tapping of said resistor to said output terminals.

14. A circuit arrangement for converting periodic electric current excursions to one side only of a reference current into electric currents varying to either side of said reference current, including a pair of input and a pair of output terminals, one terminal of each pair being connected to a point of fixed reference potential, a resistive circuit component connected across said pair of input terminals, a capacitor, a tapped resistor having the extremities connected to the terminals of said capacitor to form a shunt network, a unilateral impedance device connected between one terminal of said network and said point of fixed reference potential, and connections coupling the other terminal of said network to said input terminals and the tapping of said resistor to said output terminals, said unilateral impedance device presenting a relatively high impedance across the terminals thereof when the potential across said capacitor is greater than the potential applied to said input terminals.

15. A conversion circuit for a telegraph signalling circuit arrangement having a direct current impedance element across which a neutral mark-space signal appears, a charge storage device, a direct current voltage divider shunting said charge storage device to form a network, a unilateral impedance element connected in series circuit relationship with said network, and connections coupling said series circuit across said direct current impedance element, thereby to provide a polar mark-space signal between a point on said voltage divider and a point on said connections.

16. In a telegraph signalling circuit arrangement having a resistive circuit component across which a neutral mark-space signal appears, a capacitor and a unilateral impedance element connected in series circuit, connections coupling said series circuit across said resistive circuit component, and a resistive element having a tapping thereon connected across said capacitor for direct current transfer, thereby to produce a polar mark-space signal between said tapping on said resistive element and a point on said connections.

17. In an on-off signal receiving circuit arrangement, a signal input circuit to which direct current mark-space signals are applied, a conversion circuit responsive to said direct current mark-space signals to generate a signal voltage representative of the peak-to-peak variations of the applied signals and symmetrical with respect to a fixed datum level, a signal output circuit including control means operative to switch current on and off in said output circuit in response to a difference of signal voltage relatively small compared with the said signal voltage, and means to apply said signal voltage from said conversion circuit to said control means to render said signal output circuit responsive to said difference of signal voltage at a level intermediate the extreme values of the applied signal voltage.

18. In an on-off signal receiving circuit arrangement, a signal input circuit to which direct current mark-space signals are applied, a conversion circuit responsive to said direct current mark-space signals to generate a signal voltage representative of the peak-to-peak variations of the applied signals and symmetrical with respect to a fixed datum level, a signal output circuit including control means operative to switch current on and off in said output circuit in response to a difference of signal voltage relatively small compared with the said signal voltage, and means to apply said signal voltage from said conversion circuit to said control means to render said signal output circuit responsive to said difference of signal voltage at the datum level.

19. In an on-off signal receiving circuit arrangement, a direct current impedance element to which neutral mark-space signals are applied, a charge storage device, a direct current voltage divider shunting said charge storage device to form a network, a unilateral impedance element connected in series circuit relationship with said network, and connections coupling said series circuit across said direct current impedance element, thereby to provide between a point on said voltage divider and a point on said connections a signal voltage representative of the peak-to-peak variations of the applied signals and symmetrical with respect to a datum level, a signal output circuit including control means to switch current on and off in said output circuit in response to a difference of signal voltage relatively small compared with the said signal voltage, and means to apply said signal voltage to said control means to render said signal output circuit responsive to said difference of signal voltage at a level intermediate the extreme values of the applied signal voltage.

References Cited in the file of this patent

UNITED STATES PATENTS

| | | |
|---|---|---|
| 2,424,961 | Bancroft et al. | Aug. 5, 1947 |
| 2,513,910 | Bliss | July 4, 1950 |
| 2,606,251 | Oberman | Aug. 5, 1952 |

FOREIGN PATENTS

| | | |
|---|---|---|
| 533,371 | Great Britain | Feb. 12, 1941 |